United States Patent
Evans et al.

(12) 
(10) Patent No.: US 7,114,817 B2
(45) Date of Patent: Oct. 3, 2006

(54) EXTENDABLE FOLDABLE MIRROR

(75) Inventors: Rob Evans, Havant (GB); Roy Buckingham, New Milton (GB); Jerry Bottrill, Chichester (GB)

(73) Assignee: Schefenacker Vision Systems UK Ltd., Portchester (GB)

( * ) Notice: Subject to any disclaimer, the term of this patent is extended or adjusted under 35 U.S.C. 154(b) by 163 days.

(21) Appl. No.: 10/380,096

(22) PCT Filed: Sep. 28, 2001

(86) PCT No.: PCT/US01/42399

§ 371 (c)(1),
(2), (4) Date: Nov. 17, 2003

(87) PCT Pub. No.: WO02/27376

PCT Pub. Date: Apr. 4, 2002

(65) Prior Publication Data

US 2004/0075921 A1  Apr. 22, 2004

Related U.S. Application Data

(60) Provisional application No. 60/237,349, filed on Sep. 29, 2000.

(51) Int. Cl.
*G02B 7/182* (2006.01)
*B60R 1/06* (2006.01)

(52) U.S. Cl. ........................ 359/841; 359/877
(58) Field of Classification Search ........... 359/841, 359/872, 877, 881
See application file for complete search history.

(56) References Cited

U.S. PATENT DOCUMENTS

| 4,728,180 A | * | 3/1988 | Janowicz | 359/841 |
|---|---|---|---|---|
| 4,921,337 A | * | 5/1990 | Hou | 359/841 |
| 4,936,669 A | * | 6/1990 | Wun | 359/841 |
| 4,936,670 A | * | 6/1990 | Yoo | 359/841 |
| 5,007,724 A | * | 4/1991 | Hou | 359/841 |
| 5,864,438 A | | 1/1999 | Pace | |
| 6,116,743 A | * | 9/2000 | Hoek | 359/871 |
| 6,213,609 B1 | * | 4/2001 | Foote et al. | 359/841 |
| 6,239,928 B1 | * | 5/2001 | Whitehead et al. | 359/871 |
| 6,276,808 B1 | * | 8/2001 | Foote et al. | 359/877 |
| 6,325,518 B1 | * | 12/2001 | Whitehead et al. | 359/841 |
| 6,755,543 B1 | * | 6/2004 | Foote et al. | 359/877 |

FOREIGN PATENT DOCUMENTS

EP    0 780 266 A    6/1997

OTHER PUBLICATIONS

Supplementary European Search Report.

* cited by examiner

Primary Examiner—Ricky D. Shafer

(74) Attorney, Agent, or Firm—Warn, Hoffmann, Miller & LaLone, P.C.

(57) ABSTRACT

An extendable foldable mirror for use on a vehicle is a side view mirror that is longitudinally extendable. A mechanism is provided for moving the mirror (10) from a first normal viewing position to a second longitudinally extended position. The mirror element or mirror housing is adjusted in response to extension or retraction of the mirror to provide a consistent viewing picture.

3 Claims, 20 Drawing Sheets ature and practice- retractable for "normal" oper-

EXTENDABLE FOLDABLE MIRROR

TECHNICAL FIELD

The present invention relates to a foldable extendable mirror. More specifically the present invention relates to a foldable extendable mirror that is rigidified in the extended position and which has numerous inputs for sensing various conditions and reacting to those conditions.

BACKGROUND

In the past it has been problematic to provide mirror structures which allow for trailer towing positions when necessary but which may be retractable for "normal" operating conditions. Additionally this problem is further exacerbated by the necessity of having the mirrors foldable. It is necessary to fold the mirrors (and mandated in some countries) such that the outside mirrors are foldable into a certain dimension in order to meet legal requirements and practically speaking in order to fit in certain parking areas without hazards to pedestrian or other traffic.

Additionally, because of the lengthy extension when towing, it is necessary to protect against unwanted extension of the mirror. Since power fold mechanisms are required to fold and/or extend these mirrors there is a possibility of folding or extending the mirror into obstacles or the like.

Therefore, it is necessary to reduce the possibility of unintentional or undesirable folding or extension of the mirror.

Additionally, most towing mirror extensions or attachments require manual adjustment of the mirror surface to compensate for mirror angle at the extended position. This requires adjustment manually after extension such that the proper rearview sighting picture is obtained. This can be both cumbersome and time consuming.

The subject mirror solves these problems with a novel combination of features.

SUMMARY OF THE INVENTION

In the present invention, there is provided a side view mirror for a vehicle, which is longitudinally extendable. The mirror of the present invention includes a mechanism for moving the mirror from a first normal viewing position to a second longitudinally extended position, such as for trailer towing or the like. The mirror also includes a mirror housing for retaining the mirror element in the housing. In the first aspect of the present invention, a mirror adjustment mechanism is used for providing adjustment from a first predetermined position to a second predetermined position in response to the extension or retraction of the mirror along the longitudinal axis of extension. Thus, the mirror automatically adjusts for a trailer-towing angle when the mirror is extended, and to a "normal" angle when the mirror is retracted.

In a second aspect of the present invention, a control module is used for controlling extension and retraction of the mirror. The control module is operably interfaced with the wiring circuit of a vehicle, such that it can sense the existence of a trailer light circuit. A lockout mechanism is provided for locking out the extension capability of the mechanism when the trailer light circuit is not sensed by the control module.

In another aspect of the present invention, the mechanism includes a throat-cover portion and an inner throat portion, wherein the throat-cover portion extends over at least a portion of the inner throat portion. A mirror or other element may be attached such that the throat-cover portion covers the mirror when the mirror is in the first inboard position, and is uncovered and is visible to the driver when extended in the second towing position.

In another aspect of the present invention, a mechanism is provided for rigidifying the assembly. This mechanism includes a way of loading the extension mechanism via motors in the extended position, which rigidifies the system.

Additional advantages and features of the present invention will become apparent from the subsequent brief description of the drawings and the appended claims, taken in conjunction with the description of the preferred embodiment set forth below.

DETAILED DESCRIPTION OF THE PREFERRED EMBODIMENTS

In accordance with the present invention, there is provided a foldable, extendable mirror, shown generally at 10.

Figure 1:
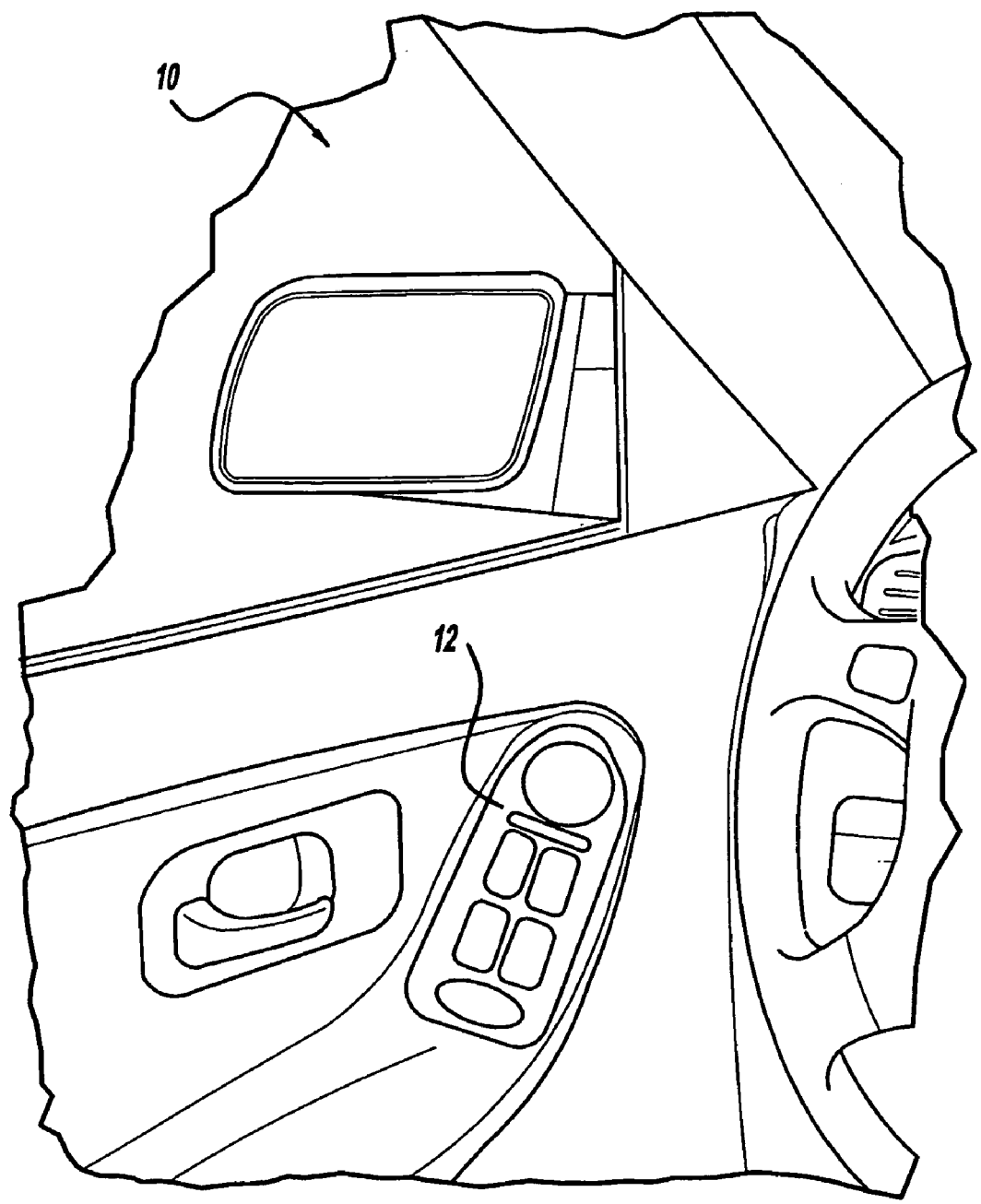
FIG. 1 is a perspective view showing the mirror and control module as described in the present invention.
Figure 2:
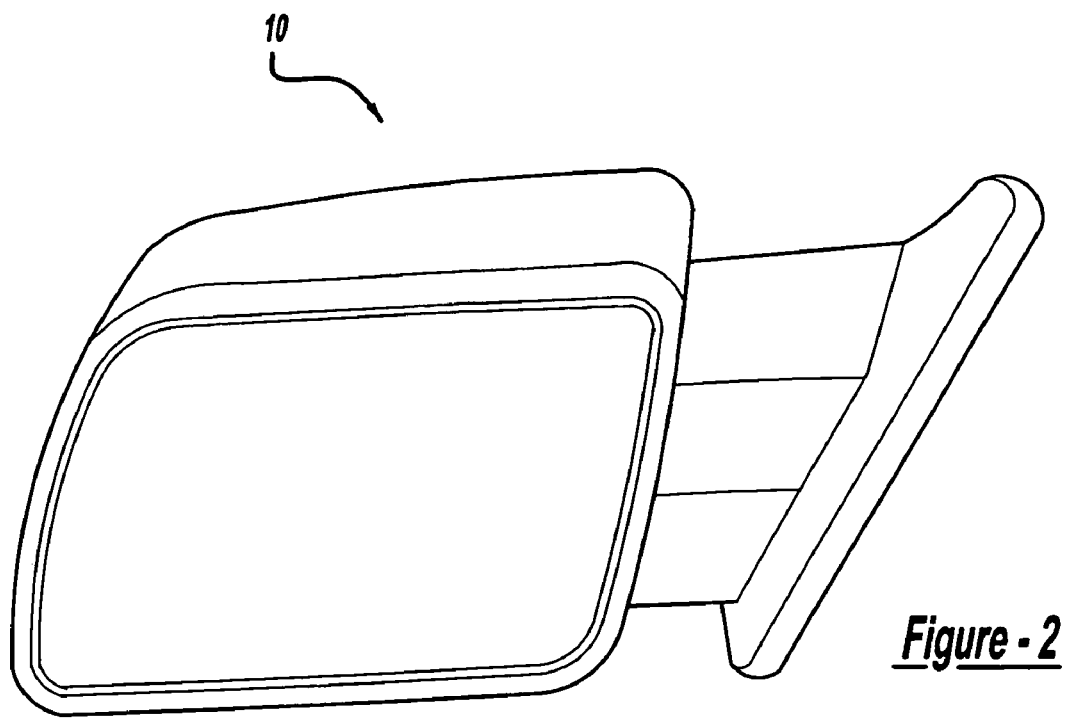
FIG. 2 is a perspective view of a extendable foldable mirror as set forth in the present invention.
Figure 3:
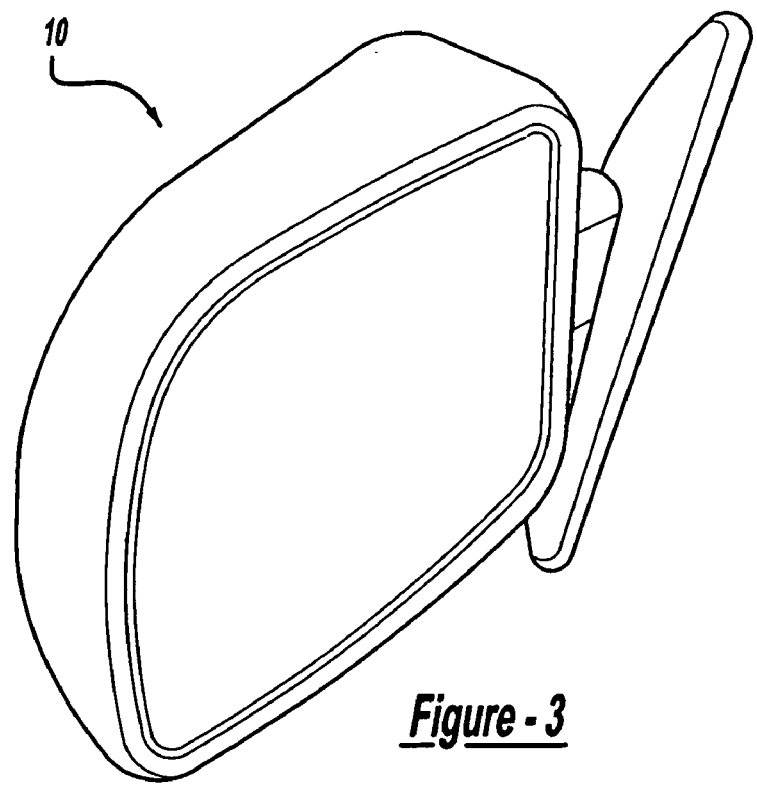
FIG. 3 is a perspective view of the mirror of FIG. 2, showing the mirror in a folded position.
Figure 4:
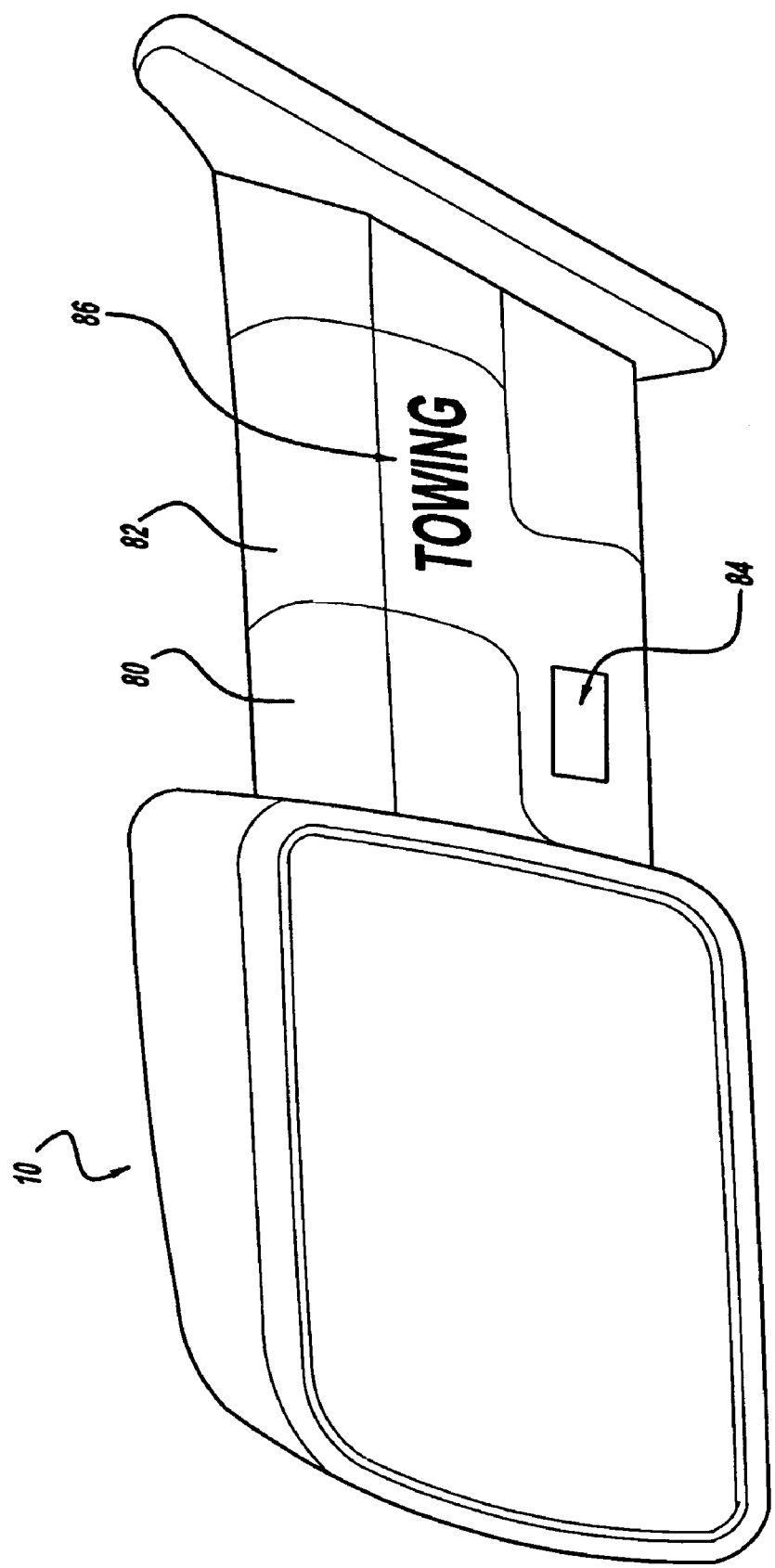
FIG. 4 is a perspective view of the mirror of FIG. 2, showing the mirror in an extended towing position.

The mirror 10 is extendable to a towing position, best shown in FIG. 4, or retractable and usable in a normal position, as shown in FIG. 2. Additionally, the mirror can be pivoted and is foldable, as shown in FIG. 3. In a preferred embodiment, the mirror is foldable and extendable or retractable by way of power. However, as can be readily appreciated, the mirror is also manually extendable in certain embodiments.

Figure 5:
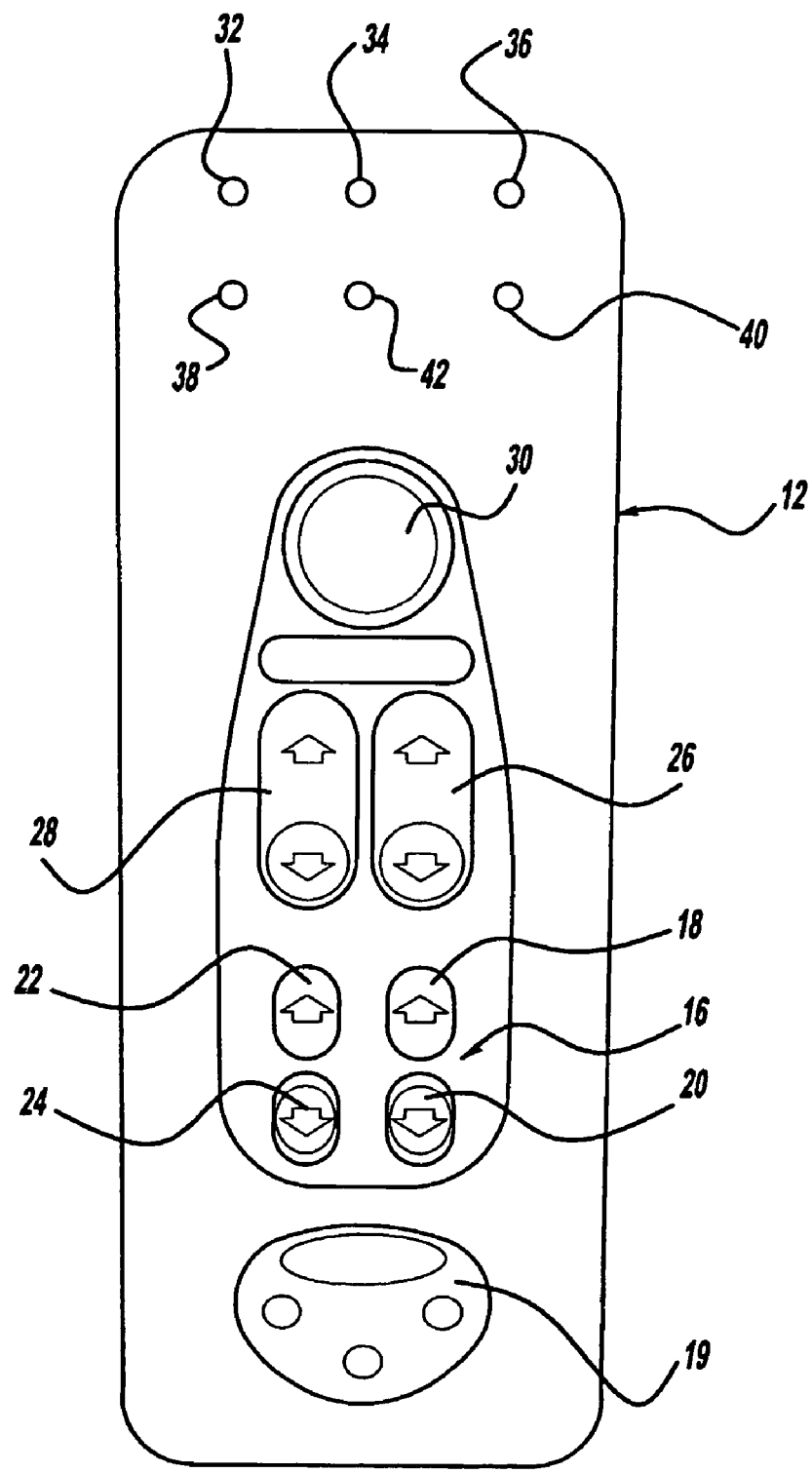
FIG. 5 is a plan view of the control module shown in FIG. 1.

In the preferred embodiment, when the mirror is controllably extendable and foldable, a control module 12 (see FIG. 5) is provided for controlling the mirror functions. The control module 12 includes circuitry and user interface inputs for controlling functions of the mirror. For instance, in a preferred embodiment, the mirror has memory capabilities, which are controllable by memory buttons 14. The use of memory positions for mirrors is known and conventional. However, in the present invention, the memory system is used for automatically compensating for mirror extension or retraction positions. Memory button set 14 includes three memory positions for drivers 1, 2 and 3, for instance. Each of these positions further includes automatic adjustment of the mirror surface between a retracted and extended positions for providing a proper sight picture.

Additionally, the control module includes a folding-in positioning button set 16 on the first side of the folding position button set, and includes a first button 18 and a second button 20 for folding of the mirror or viewing of the mirror, and whether the vehicle needs to have the mirror folded for parking, storage or the like. On the left hand side buttons, 22 and 24 control extending the mirror in and out, out into the towing position and back into the retracted position. Buttons 26, 28 and toggle movement button 30 are used to adjust the mirror pane itself. Additionally, on the upper hand of the controller, indication lights are provided for the following mirror functions. In the present controller, functions are provided for mirror extend 32, power fold 34 and mirror memory 36. Additionally, a trailer mode light 38 is provided, which is indicative of the trailer towing wire harness being connected. Also provided is an indicator light system 40 for power in the present application, and an auxiliary light 42, which may be programmed to any specific function as may be desired, such as for use as an obstacle alarm.

Figure 6:
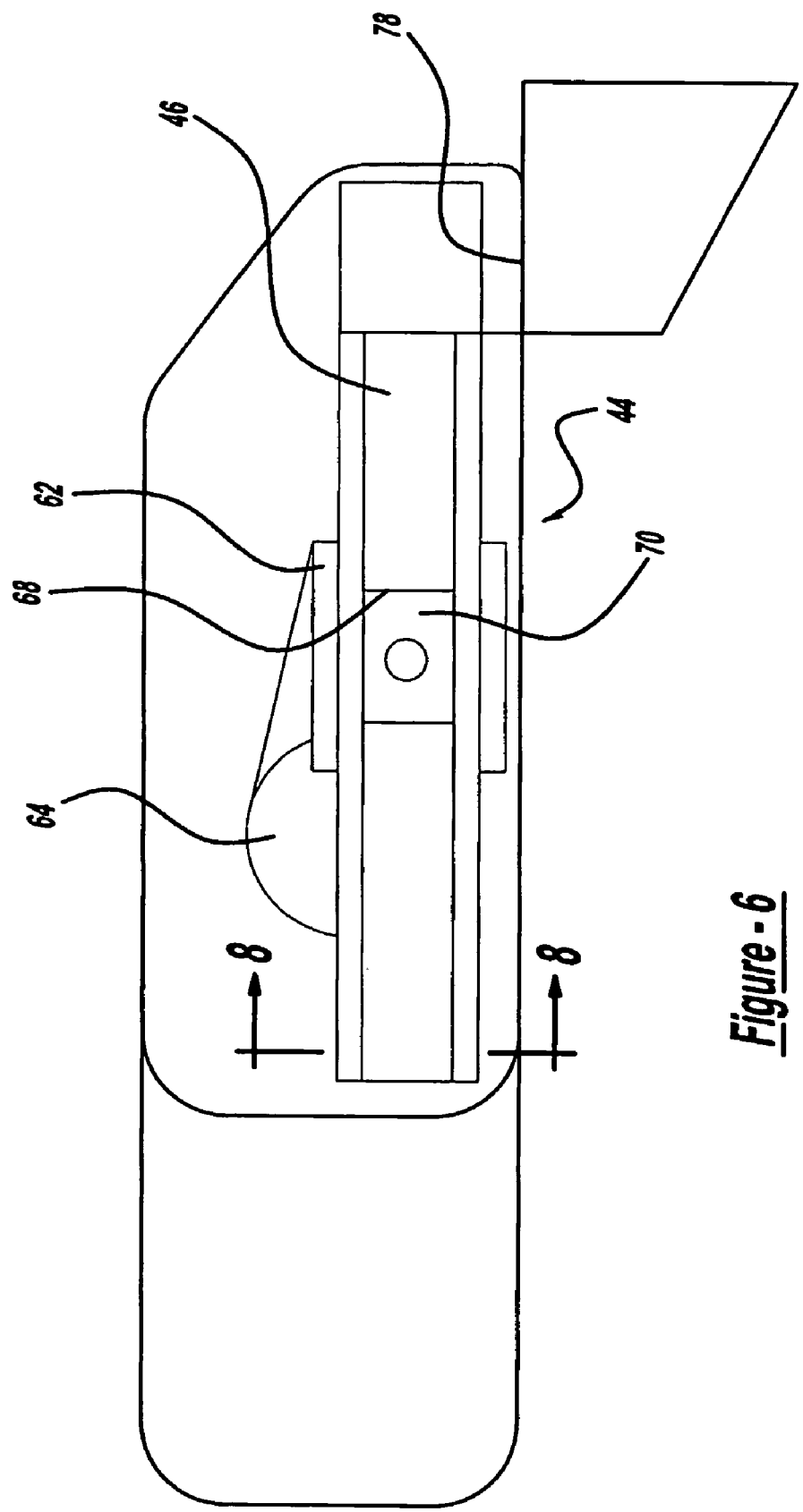
FIG. 6 is an embodiment showing an extension mechanism for use with the mirror of the present invention.
Figure 7:
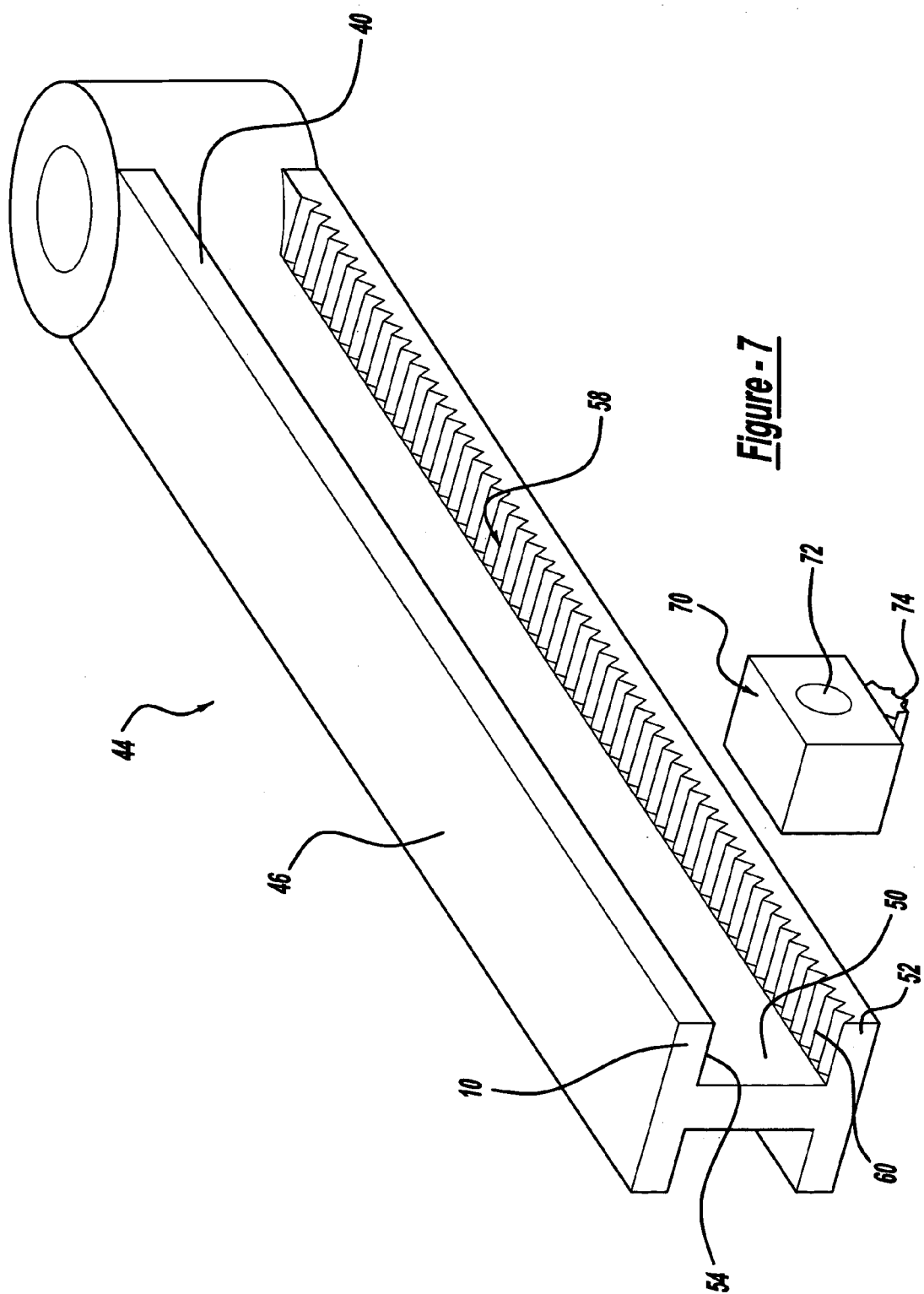
FIG. 7 is a detailed view of the rack and pinion type arrangement for extension of the mirror.
Figure 8:
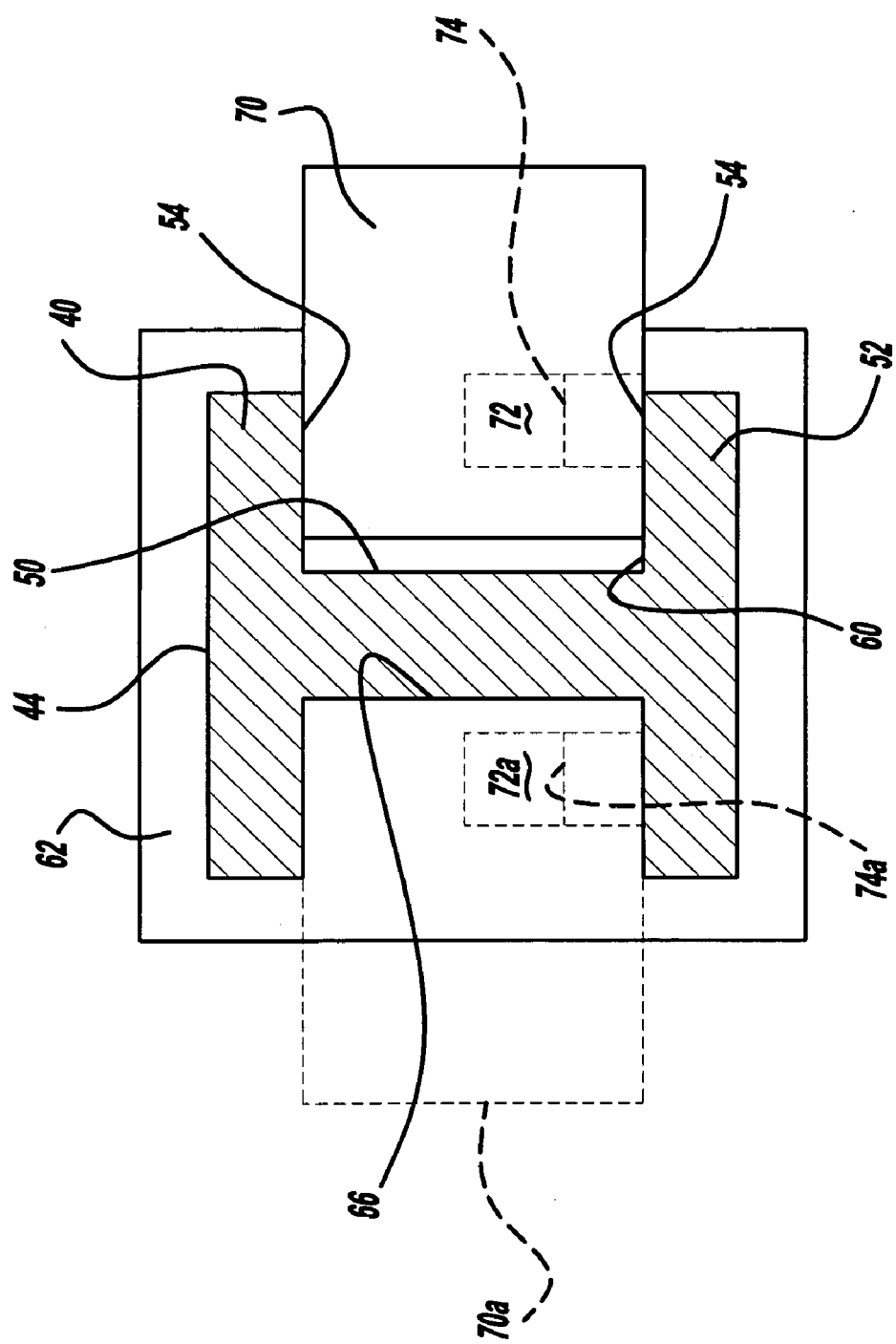
FIG. 8 is a section taken along line 8—8 of FIG. 6.

Referring to FIGS. 6 through 8, there is shown a detailed view of the extending and folding mechanism of a first embodiment of the present invention. A mechanism for extending the mirror from a first inboard position, to a second extended, towing position, is generally indicated at 44. This mechanism generally includes an I-beam rack 46. I-beam rack includes an upper leg 40, a center connecting leg 50, and a lower leg 52. Upper leg 40 has an inboard surface 54 and lower leg 52 has an inboard surface 58. In a preferred embodiment, surface 58 includes gears 60 for forming a rack.

Frame 62 is operably attached to the mirror housing 64, for guiding the I-beam rack. The frame includes an I-beam channel 66, which acts as a guide for the I-beam rack 46. The frame 62 includes an aperture 68 for operable attachment of a motor system 70. Motor system 70, includes a pinion gear 74 operatively attached to a motor 72, which is operably connected thereto for driving of the rack relative to the frame.

Figure 13:
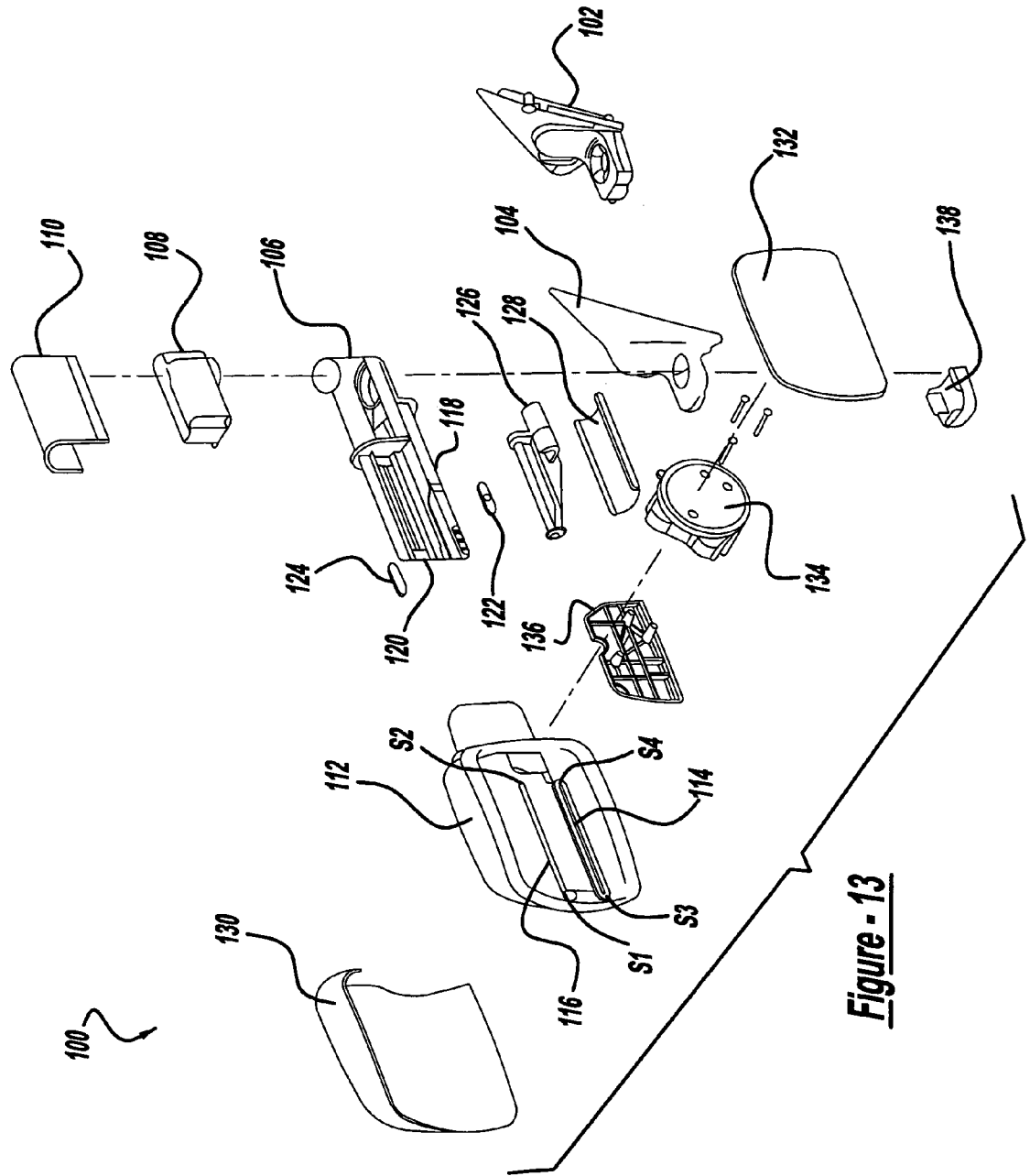
FIG. 13 is an exploded view of the mirror extension mechanism, as shown in the mirror of FIG. 12.

Also, a second motor system may be provided in an alternate embodiment 70a. The second motor system may also be provided on the other side of frame 62, as shown at 70a. Frame 70a includes motor 72a, pinion gear 74a. Thus upon actuation of the extend button on the controller, the motors drive the frame system along the rack 62, and extend the system to its end extended position. Stops are provided, such as those formed on a surface of the guide tracks of the mirror casing (e.g., see elements S1, S2, S3, and S4 in FIG. 13), for the limits of the mechanism. At the stops, the motors are overdriven, such that tension is placed on the assembly between the rack and the frame to provide rigidity into the system.

A basic pivot mechanism 78 is shown. Pivot mechanisms such as that shown in U.S. Pat. No. 5,971,554, hereby incorporated herein by reference, are readily utilized. Additionally, power fold mechanisms may also be utilized as are conventionally known in the art. In the power fold features and also in the extension features, there is an over-current sensor circuit within the motor, that if the mirror attempts to extend in a direction which is blocked by an obstacle, the mirror will not continue extending but will retract to its previous position.

Referring now to FIG. 4, it can be shown that the mirror extension system includes an outer throat cover portion and an inner throat portion, 80 and 82, respectively. As can be seen from this figure, as the mirror extends, the outer throat cover portion reveals the inner throat portion 82. This leaves a few different options as to what indicia can be placed on the inner throat portion to be revealed upon towing. For instance, the throat may contain a spotter mirror and/or spotlight, generally shown at 84, or other indicia as may be desired in a particular application. Additionally, on the upper portion, there may be indicia such as a logo or a towing insignia to indicate that the vehicle has a load it is towing, as shown in 86.

Figure 9:
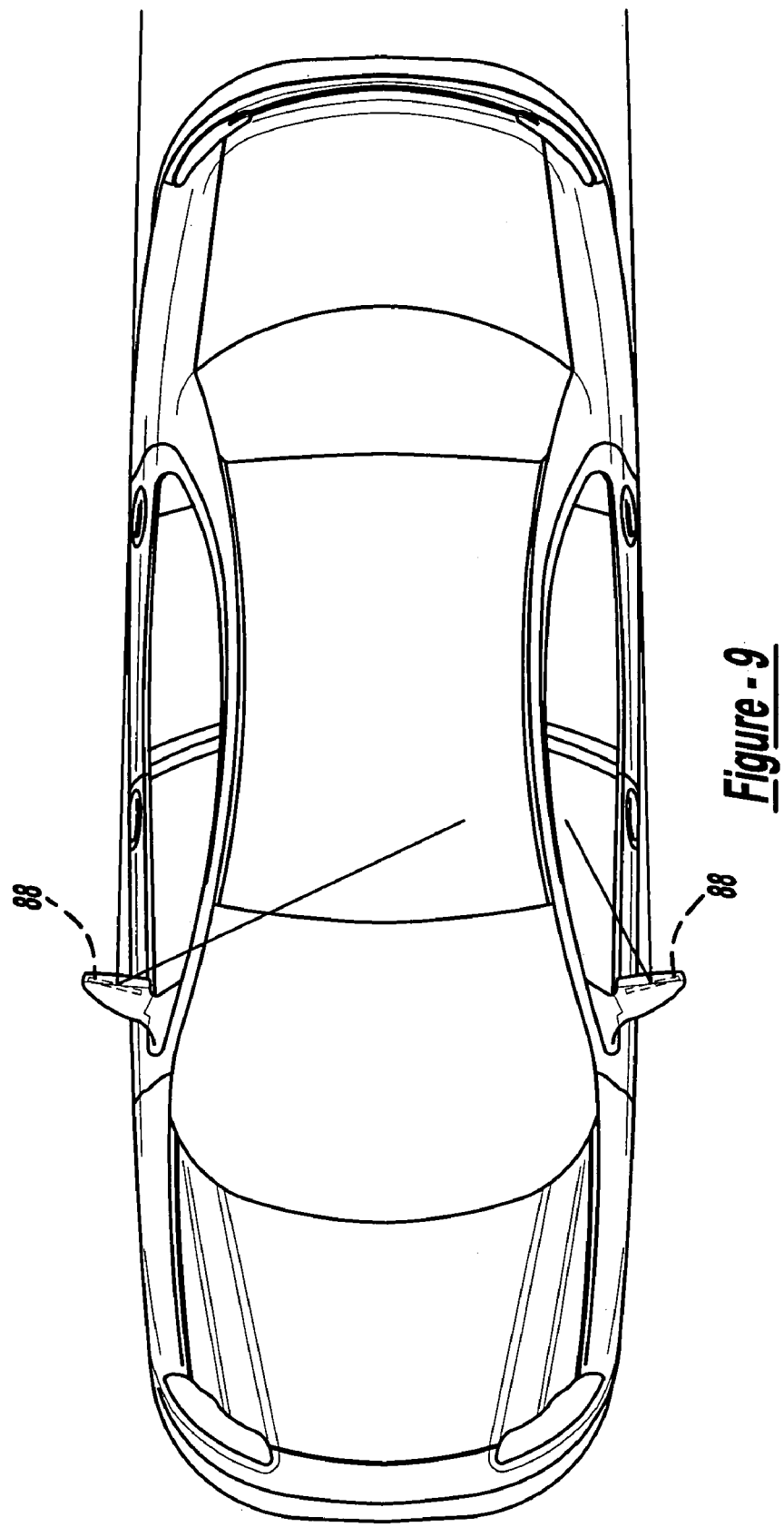
FIG. 9 is a plan angle view showing the reflective elements of the mirror of the present invention in the retracted position.
Figure 10:
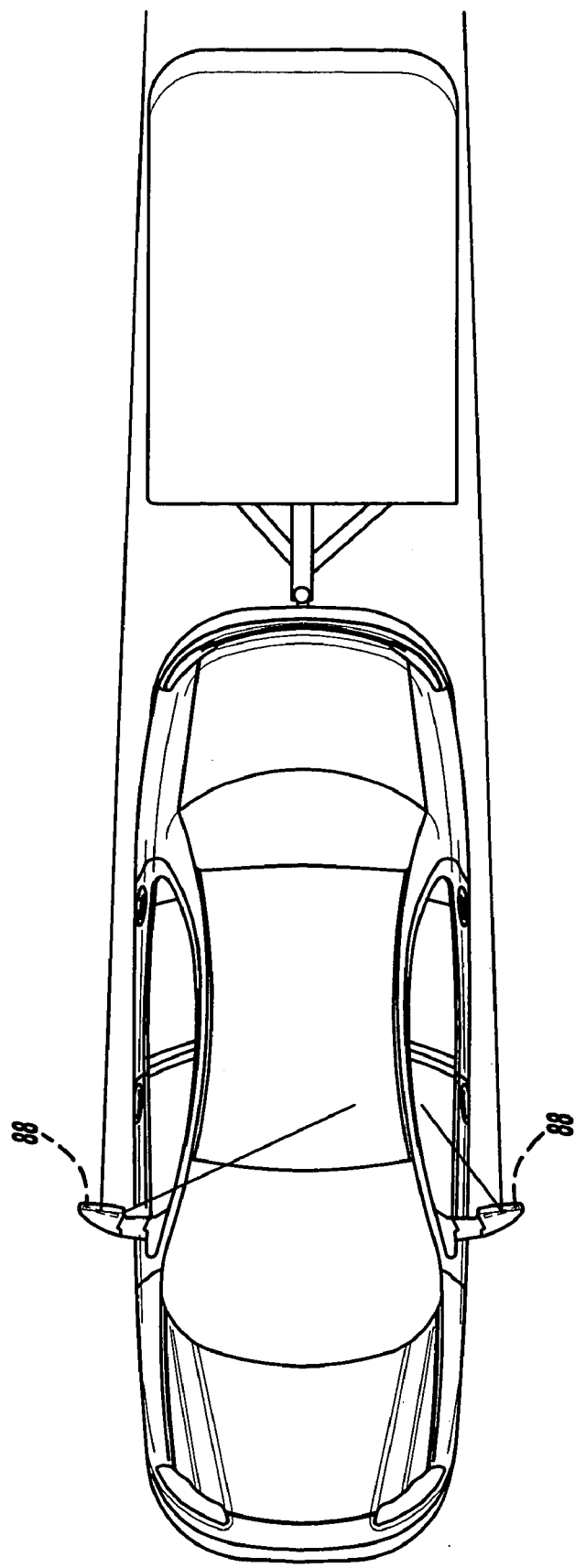
FIG. 10 is a view showing the mirror elements changed for a second extended viewing position for towing of a trailer.
Figure 11:
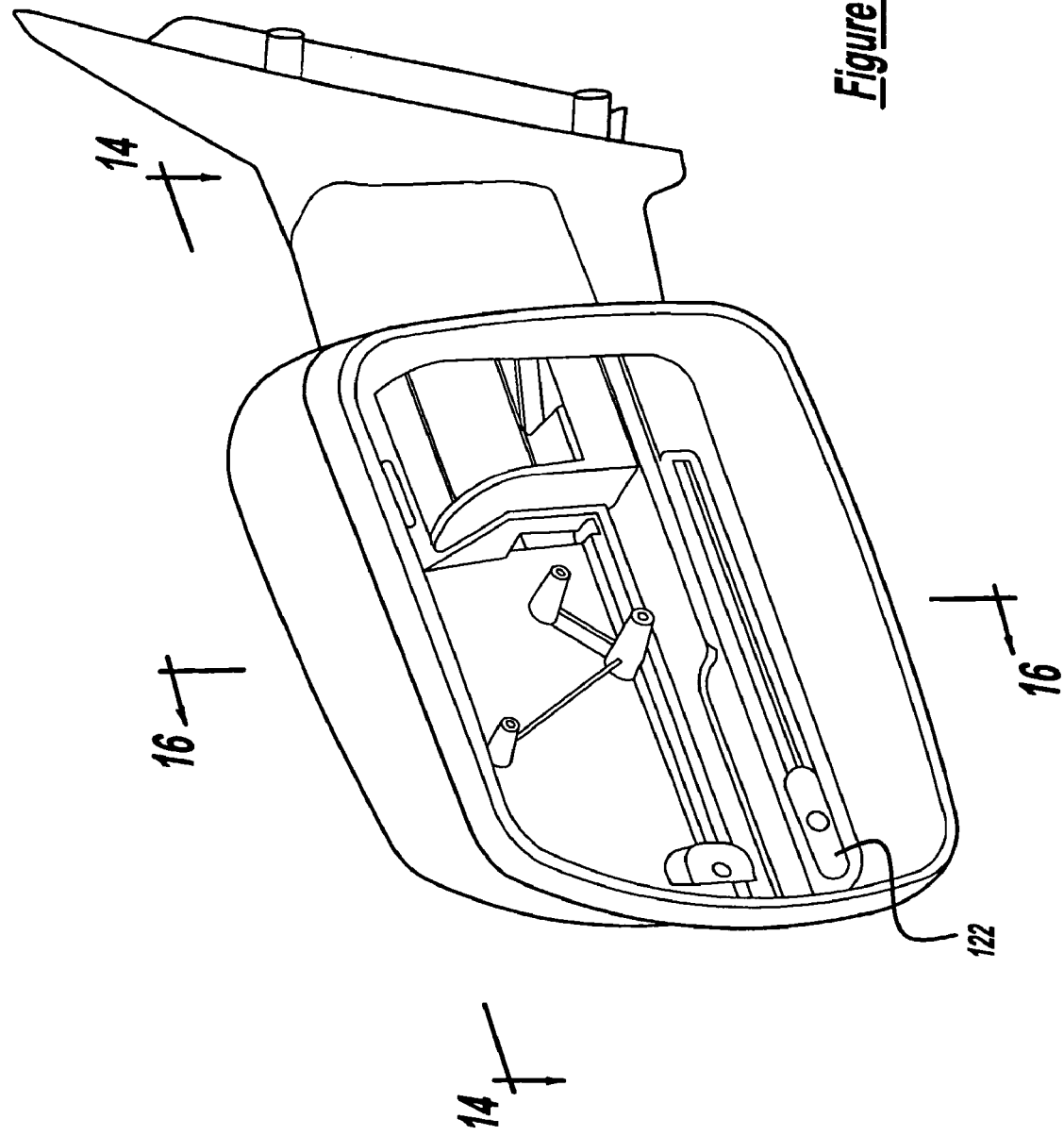
FIG. 11 is a perspective view of a second embodiment of the mirror extension mechanism in accordance with the teachings of the present invention.

A still further feature of the present invention, is automatic adjustment of the mirror surface 88. As shown in FIGS. 9 and 10, the mirror of the present invention automatically compensates for extension in the mirror angle in the extended position. This feature is available for mirrors that have memory in their system. Thus, in the retracted position, the mirror is in a first position for rear view mirror viewing conventionally. In the extended mirror position, the mirror changes to a second angle, which is conducive for towing of the vehicle such that no manual actuation or adjustment of the mirror is necessary (unless desired by the driver).

In a still further embodiment of the present invention as set forth above, the control unit senses whether a trailer towing light harness is connected into the vehicle wiring system. If the light harness is connected, the mirror can extend via the manual actuation of the button, or the control unit also could provide automatic extension of the mirror upon initial sensing of hook-up of the wiring harness for a trailer towing light.

In accordance with the present invention, the control module also has an automatic track feature, such that the towing mirror retracts from the towing position when either the trailer electrics are unplugged, the ignition is switched off, power fold of the mirror is selected, or if abnormal forces are detected, i.e., someone leaning on the mirror.

Additionally, in a still further aspect of the present invention, the mirror has a cruising position, such that when cruising, the mirror glass goes to a still further position which provides partial retraction for improved aerodynamics during towing operations.

Referring now to FIGS. 11 through 16, there is shown more detail of an alternate embodiment of the foldable extendable mirror of the present invention.

Figure 12:
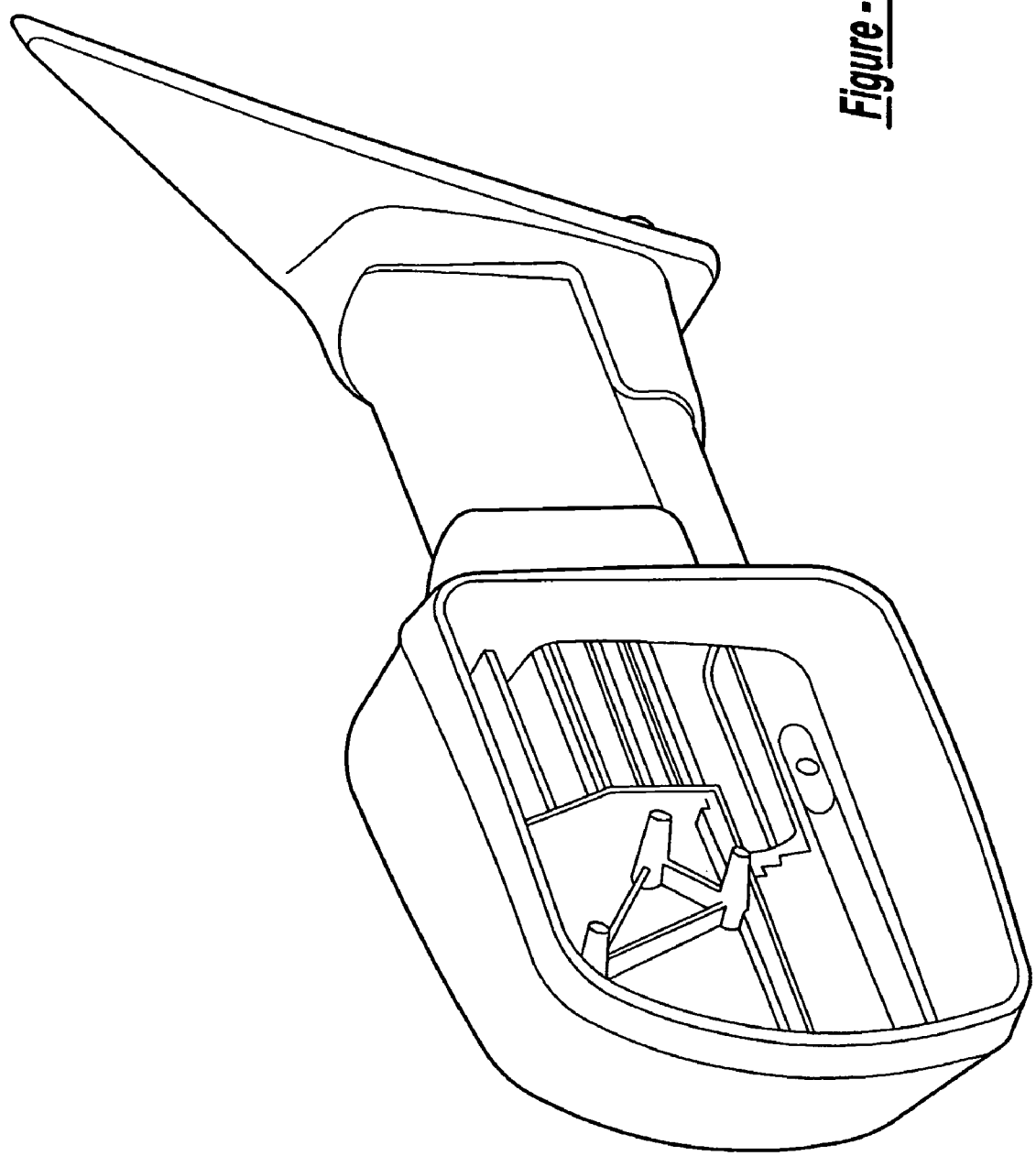
FIG. 12 is a view of the mirror of FIG. 11, showing the mirror in an extended position.

In accordance with an alternate embodiment of the foldable extendable mechanism of the present invention, there is shown a foldable extendable mirror 100. Referring now to FIG. 12, there is shown an exploded view of the foldable extendable mirror 100. As set forth in FIG. 12, the mirror 100 includes a bracket 102, which is attachable to a vehicle. In the embodiment shown, the bracket 102 is a sail attachment. The bracket is covered by an aesthetic cover portion 104. A cassette 106 is operatively associated with the bracket portion 102 and cover portion 104 for folding. A motor mechanism 108 is provided and secured onto the cassette 106 by the clip member 110. Thus, in operation, the motor operates to fold the cassette mechanism, and thereby the mirror, upon input from the control module.

The mirror casing 112 includes guide tracks 114 and 116. Cooperating surfaces 118 and 120 are provided on the cassette 106 for sliding along guide tracks 114 and 116. Stabilizer guides 122 and 124 are provided for stabilizing the sliding engagement between the cassette 106 and the mirror casing 112. Motor mechanism 126 is provided for powering the relative movement between the mirror casing 112 and the cassette 106. A securement clip 128 holds the mirror mechanism in place on the cassette 106. The mirror casing is finished with a scalp portion 130. The mirror element itself, 132, is held in place by way of backing member 134, which is attached to the casing by way of attachment member 136. End cap 138 is provided for holding the folding assembly together.

Referring now to FIGS. 12 through 16, there is shown more detail of the foldable extendable assembly.

Figure 14:
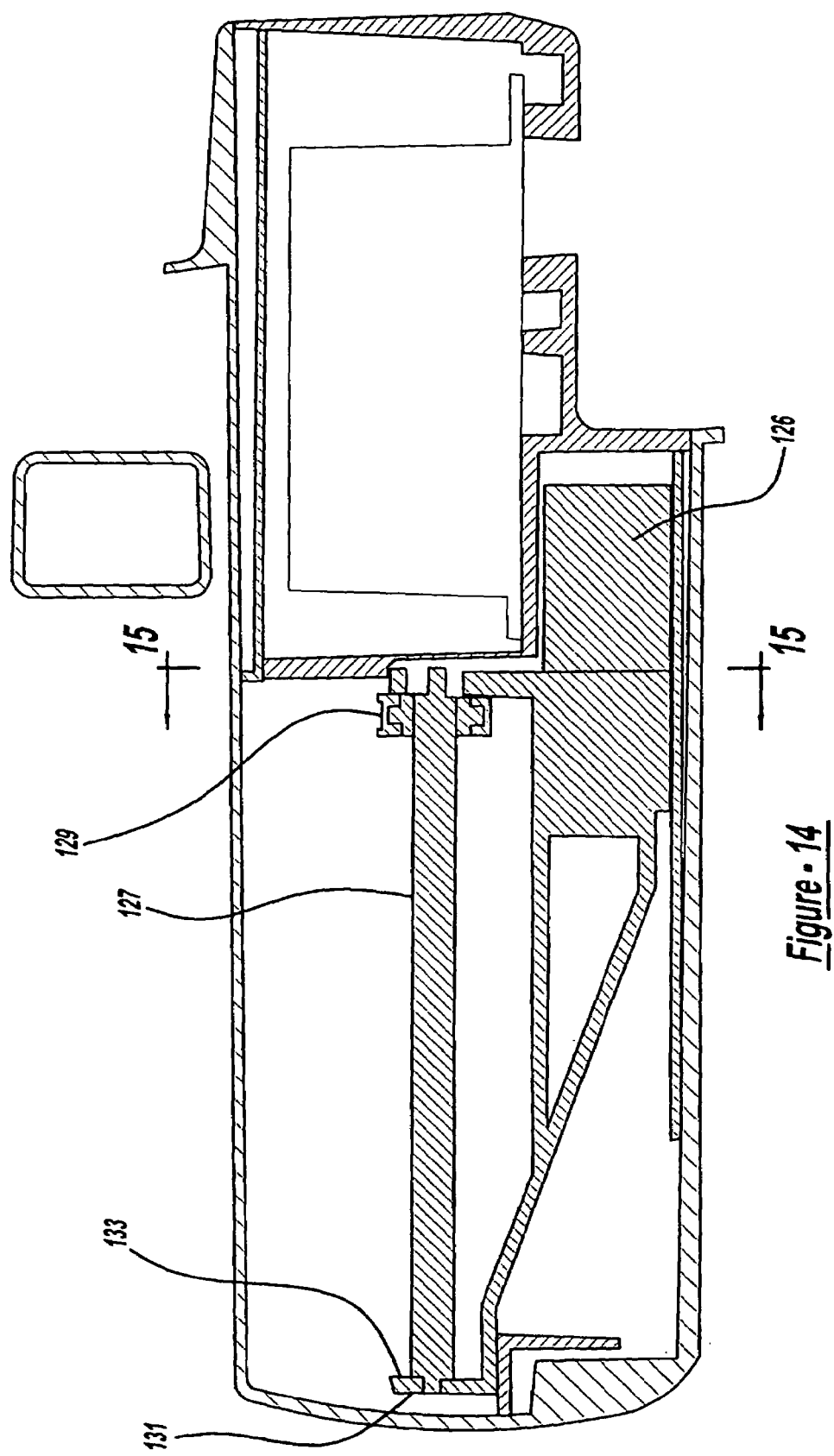
FIG. 14 is a sectional view taken along line 14—14 of FIG. 12.
Figure 15:
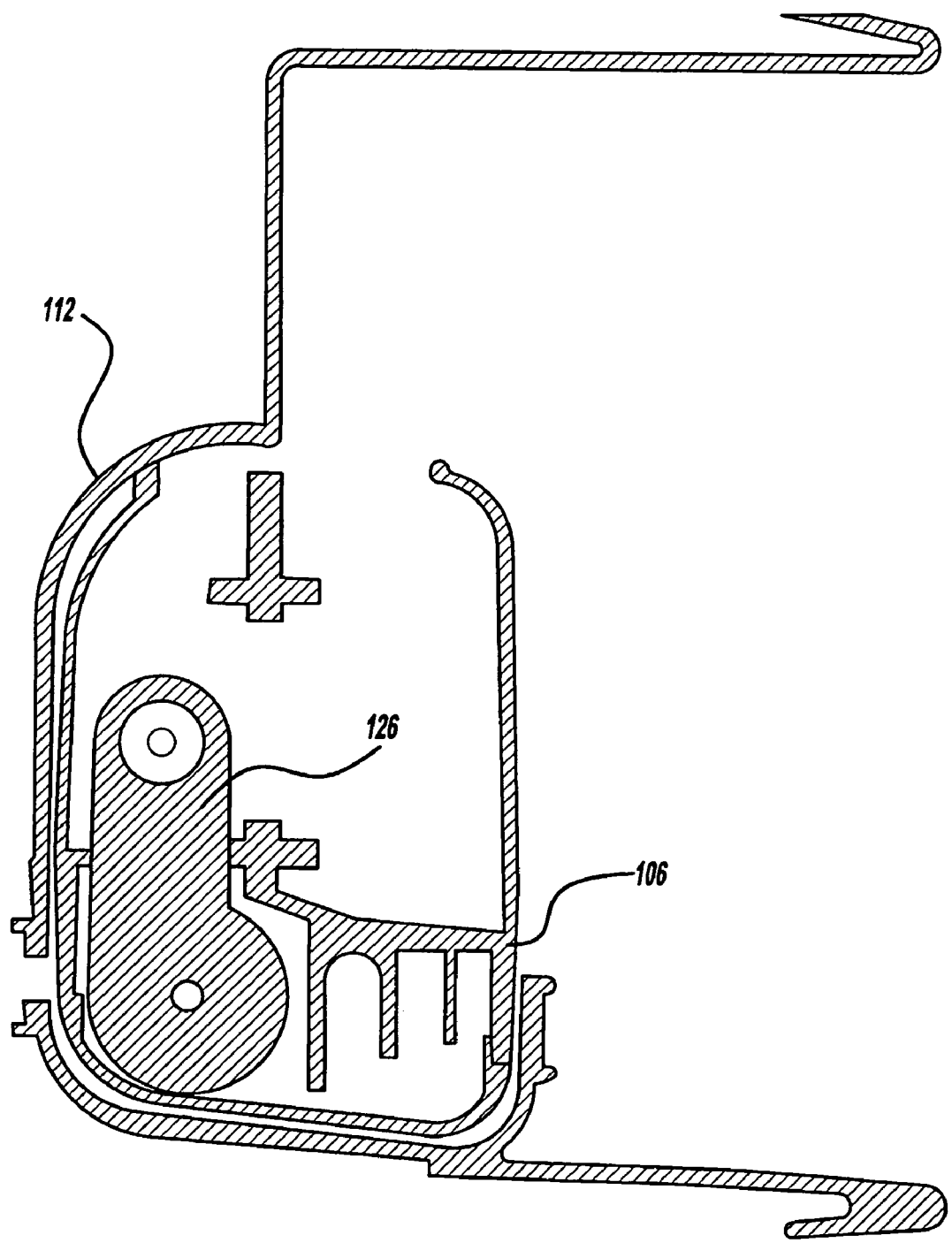
FIG. 15 is a sectional view taken along line 15—15 of FIG. 14.
Figure 16:
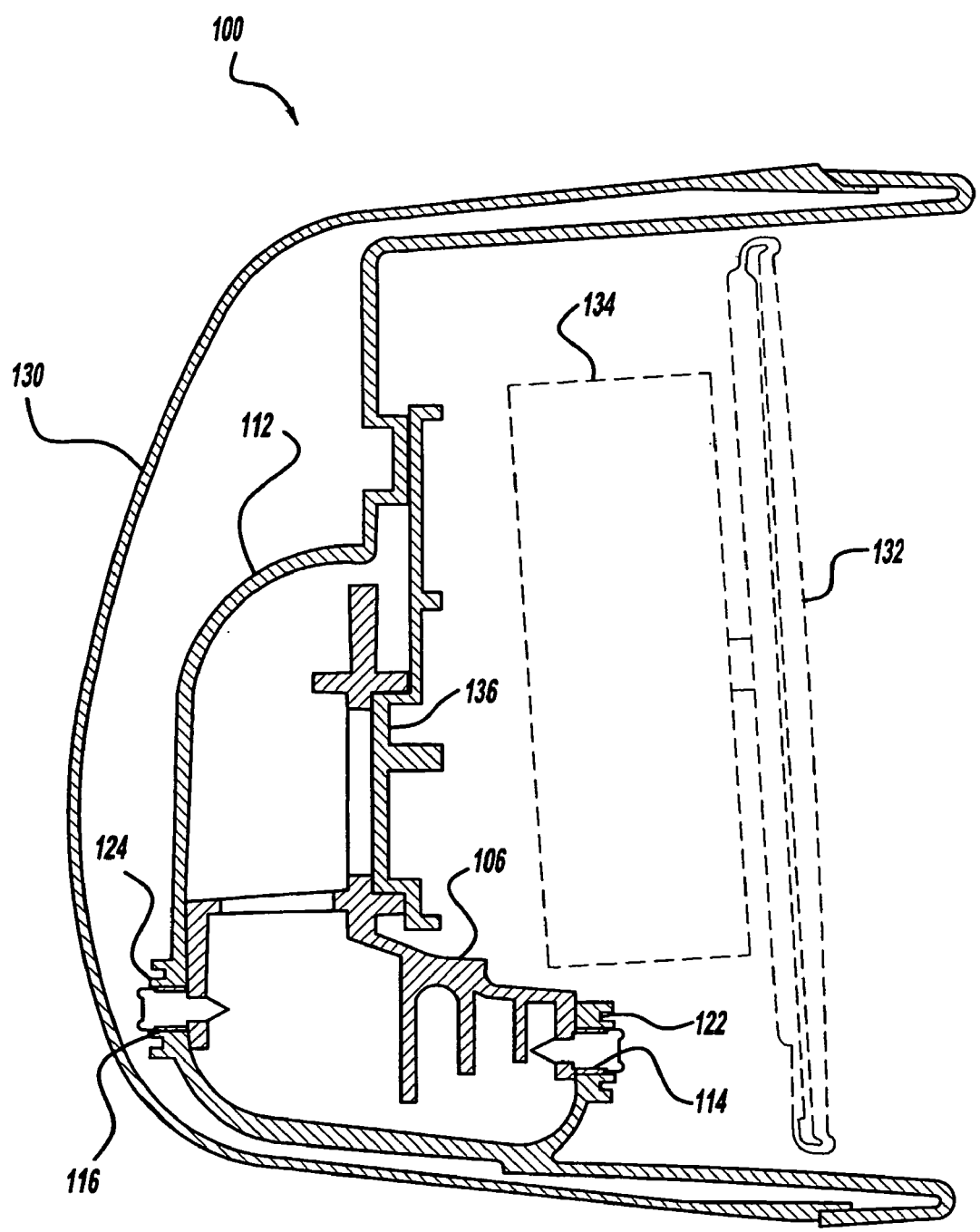
FIG. 16 is a sectional view taken along line 16—16 of FIG. 12.

Referring now to FIG. 14, the motor mechanism 126 actuates a threaded shaft member 127. Threaded shaft member interacts with nut assembly 129 and is pivoted in the second end 131. The nut 129 is operatively attached to the mirror casing 112, such that upon actuation of the motor mechanism, the mirror casing extends or retracts until reaching the stop 133. Thereafter, the motor is overdriven in order to lock rigidity into the system.

Referring now to FIGS. 17 through 21, there is shown flow charts demonstrative of the software control utilized in the present invention. With respect to the electrical system used by the subject invention, a suitable central processing unit is utilized as is known to those skilled in the art. In the control block functions of FIGS. 17 through 21, the following parameters apply. All switch inputs are converted to rising edge pulse signals during processing. The towing plug input is converted to a pulse on upon the fall of an input signal. After initiation pulse into the CPU, all operations in the attached flow chart continue in an automatic sequence. Status markers are set at the end of the auto sequence to register if the mirror function is completed. Additionally, status markers are set at the end of the auto sequence to register if mirror functions are not completed. Signals used to determine whether a function is completed or not may be derived from one or more of the group consisting of timer or time delay, motor current monitor, hall effect proximity inputs, pulse counts from a rotating shaft or encoder, and/or pulse frequencies from motor commutators.

With respect to the functions, the control system allows the mirror to extend outboard and retract inboard. The mirror also has the feature of an extended interlock from the vehicle towing plug connection and a retract initiation if the vehicle towing plug is disconnected. The mirror includes extended interlock with the mirror power fold and power fold interlock with retract. As set forth above, the mirror reflective surface viewing angle is made after extend and retract functions. In addition, the mirror axial scan function in conjunction with the extending viewing angle compensation may be selected, or a mirror axial scan is also available in retract viewing angle compensation.

Additionally, the software allows extend and retract obstruction sensing, and emergency cancellation of extend and initiation of retract functions, if necessary. The software also provides for extend and retract failure to complete sequence alarms. In addition, upon vehicle central locking, the mirrors automatically retract and power fold may be initiated, if desired.

As set forth in the drawings, the following abbreviations of Table 1 are used:

| | |
|---|---|
| CPU | Central Processing Unit or Local Control System; |
| STATE | Logical HIGH or LOW level of an input/output or point of CPU memory, |
| AND | Logical AND state; |
| ANI | Logical AND INVERSE state; |
| OR | Logical OR state; |
| ORI | Logical OR INVERSE state; |
| OUT | Non-latched high state point of memory, output or driver; |
| SET | Latch high state of memory, output or driver; |
| RST | Forced reset to low state of memory, output or driver; |
| PLS | Conversion to a pulse from a high or low state signal; |
| MKR | "Marker" point of CPU memory; and |
| P/B | Push button manual input on vehicle. |

Figure 18:
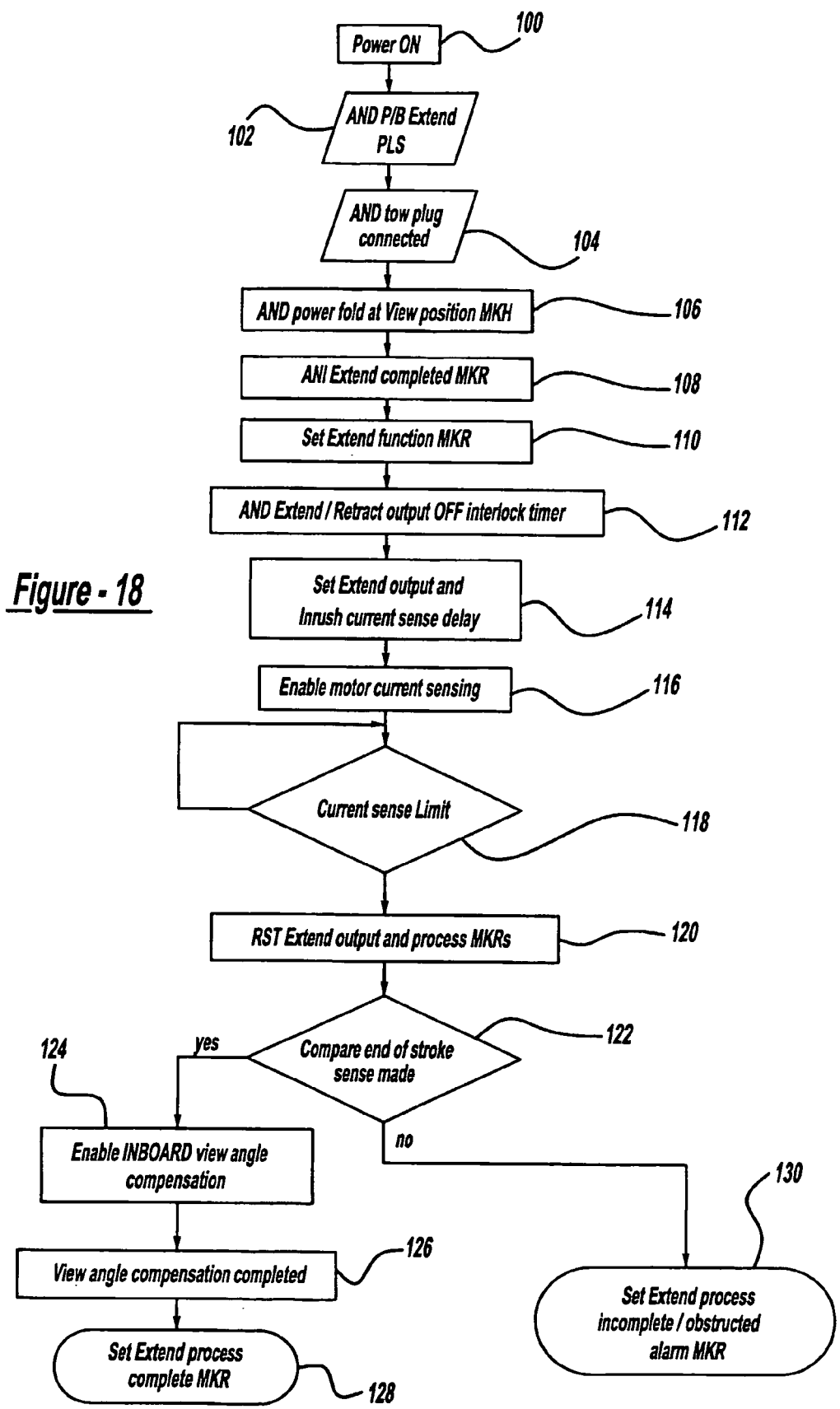
FIG. 18 is a block diagram of the operating system for the extend function of the present invention.

Referring now to FIG. 18, extend features of the present invention are illustrated. The vehicle senses a power on condition, as set forth in block 100. Upon having an extend pulse from the switch as set forth in 102, and having a signal in block 104 that the towing plate is connected, the mirror begins to extend if the mirror is not in the power fold position as shown in 106. Therefore, the mirror extends via blocks 108 and the extend marker is set in the CPU at block 110. If the extend retract output off and lock timer is not tripped at 112, the set extend output and in-rush current sense delay is actuated 114, to provide an over current for structurally locking. The mirror mechanism takes place via the current sense limiter loop 118 until the proper over current is reached and the reset extend output and process markers 120 are set. Upon completion of the stroke at block 122, the software senses completion of the stroke and enables the inboard viewing angle at block 124, and after the viewing angle compensation is completed, the extend process complete marker is set in the CPU. If the block on 122 does not sense an end of stroke, the extend process alarm marker is set and the mirror automatically retracts (see block 130).

Figure 17:
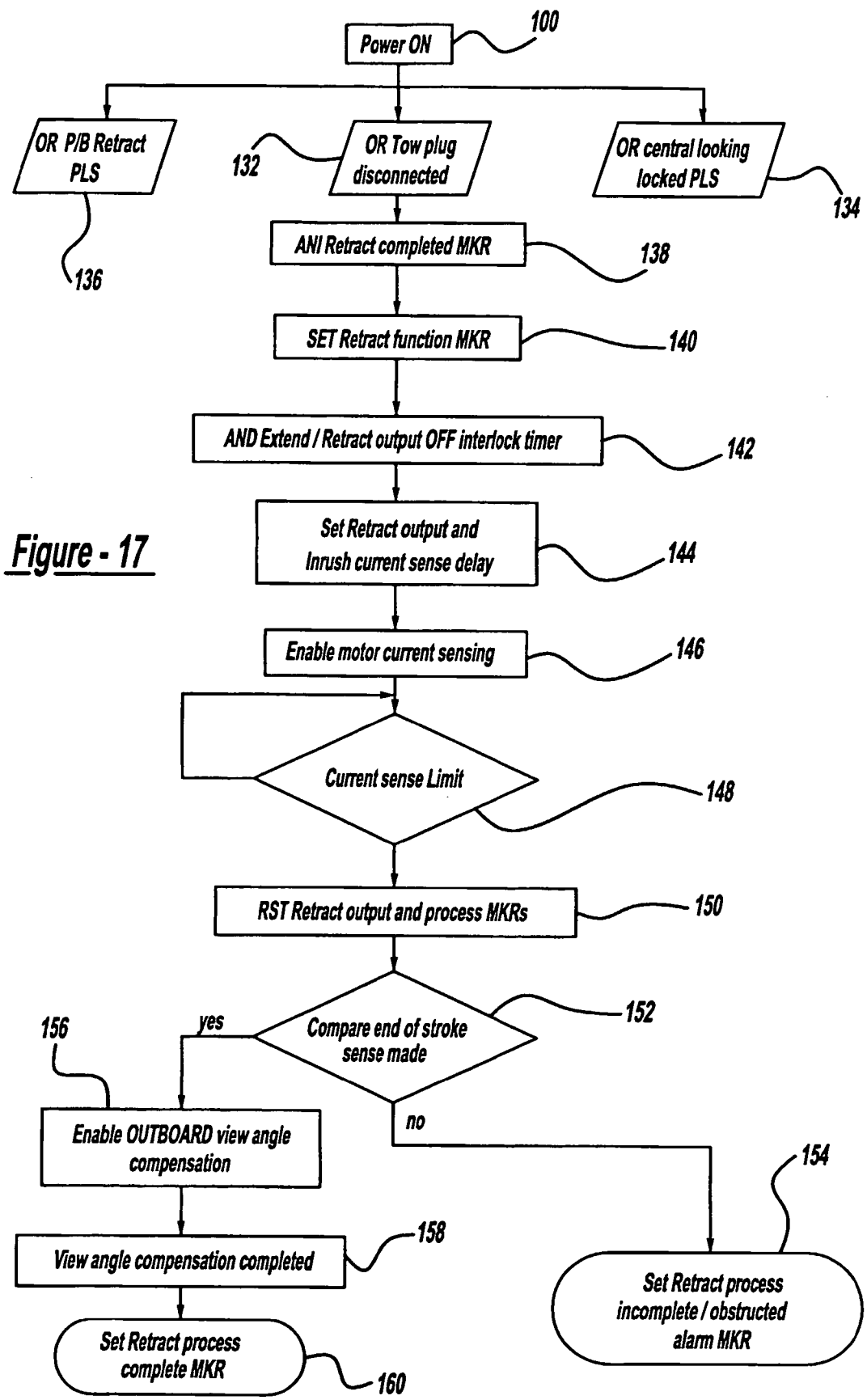
FIG. 17 is a block diagram of the operating software for the retract function of the subject invention.

With respect to FIG. 17, the retract function is shown. Again, a power on block is the initial sequence. Thereafter, if the pull plug is disconnected such as at 132, the central locking pulse is detected 134, or if the push button retract is pressed 136, the retract marker is set at 138, and then the retract function begins at block 140. If the extend retract output is off as to the interlock timer, the motor begins to retract at block 144 and the motor current sensing 146 is enabled. Upon reaching the current sense limits by loop 148, motor current sensing is monitored along with retract output marker 150 and end of stroke sensing 152. If end of stroke sensing is not completed, block 154 comes into play and the alarm marker is set off and the process of retraction is stopped. However, if the end of stroke sense is complete, the outboard view angle compensation is made at block 156 and the view angle is completed by block 58 and, thereafter, the CPU is set to a complete retract process marker for further processing.

Figure 19:
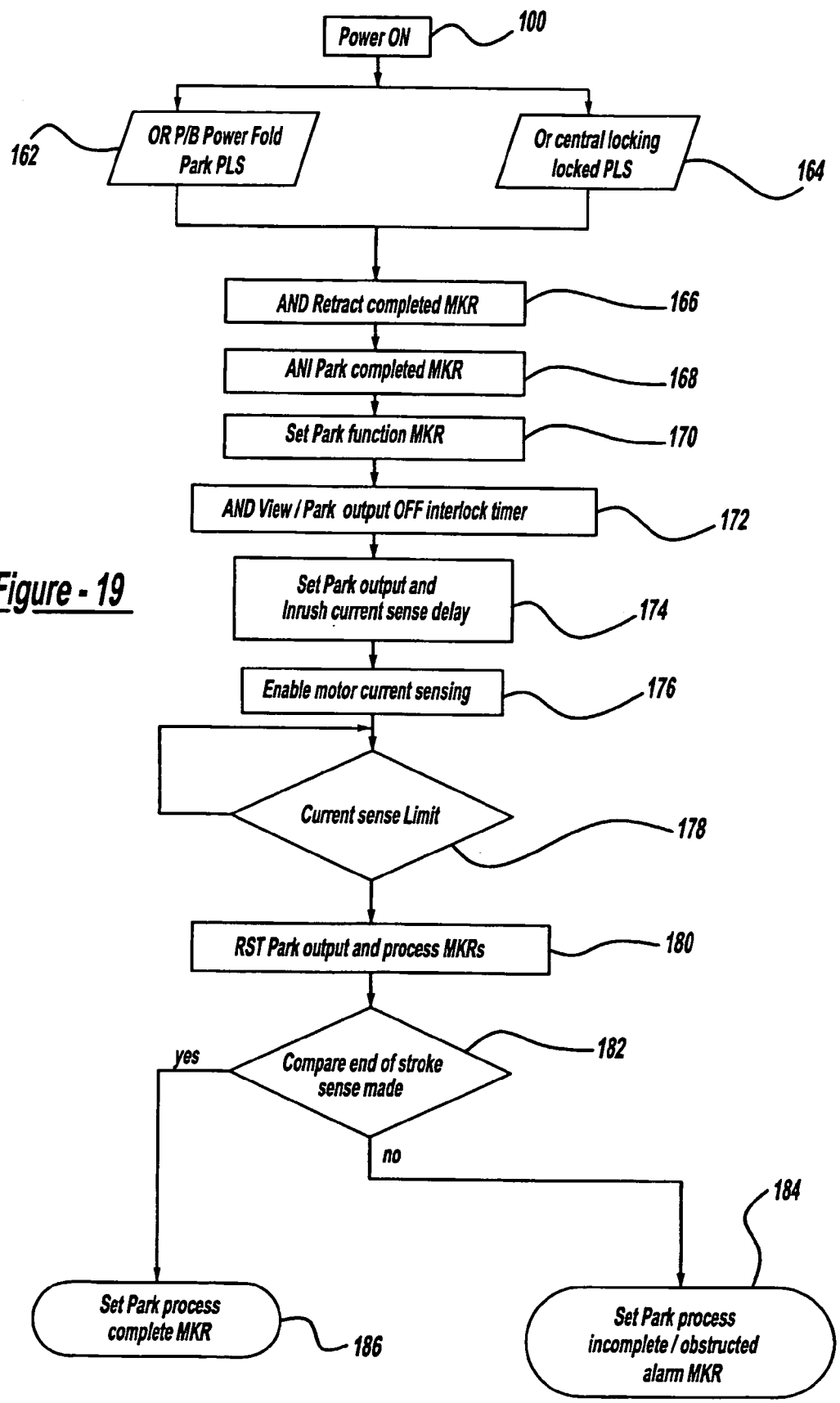
FIG. 19 is a block diagram of the operating system for the power fold/park function of the present invention.

Referring now to FIG. 19, the power fold park function is set forth. Upon sensing of a manual switch 162 or a central locking lock pulse 164, and after sensing that the retract sequence is completed at block 166, the park completed block is initialized at 168 and the park function marker is set at 170. If the view/output park inlet timer is off at 172, the park output and in rush current sense delay is activated and the power fold mirror begins folding to its folded inward position. Motor current sensing is enabled at block 176 and the current sensing loop 178 is utilized for providing the proper folding of the mirror to a certain predetermined position 180. Thereafter, the end of stroke sequence is sensed at block 182. If the power fold mirror is incomplete or obstructed, an alarm marker goes off and the mirror stops its movement by block 184. Otherwise, the end of stroke sense is made and the park process is complete at 186.

Figure 20:
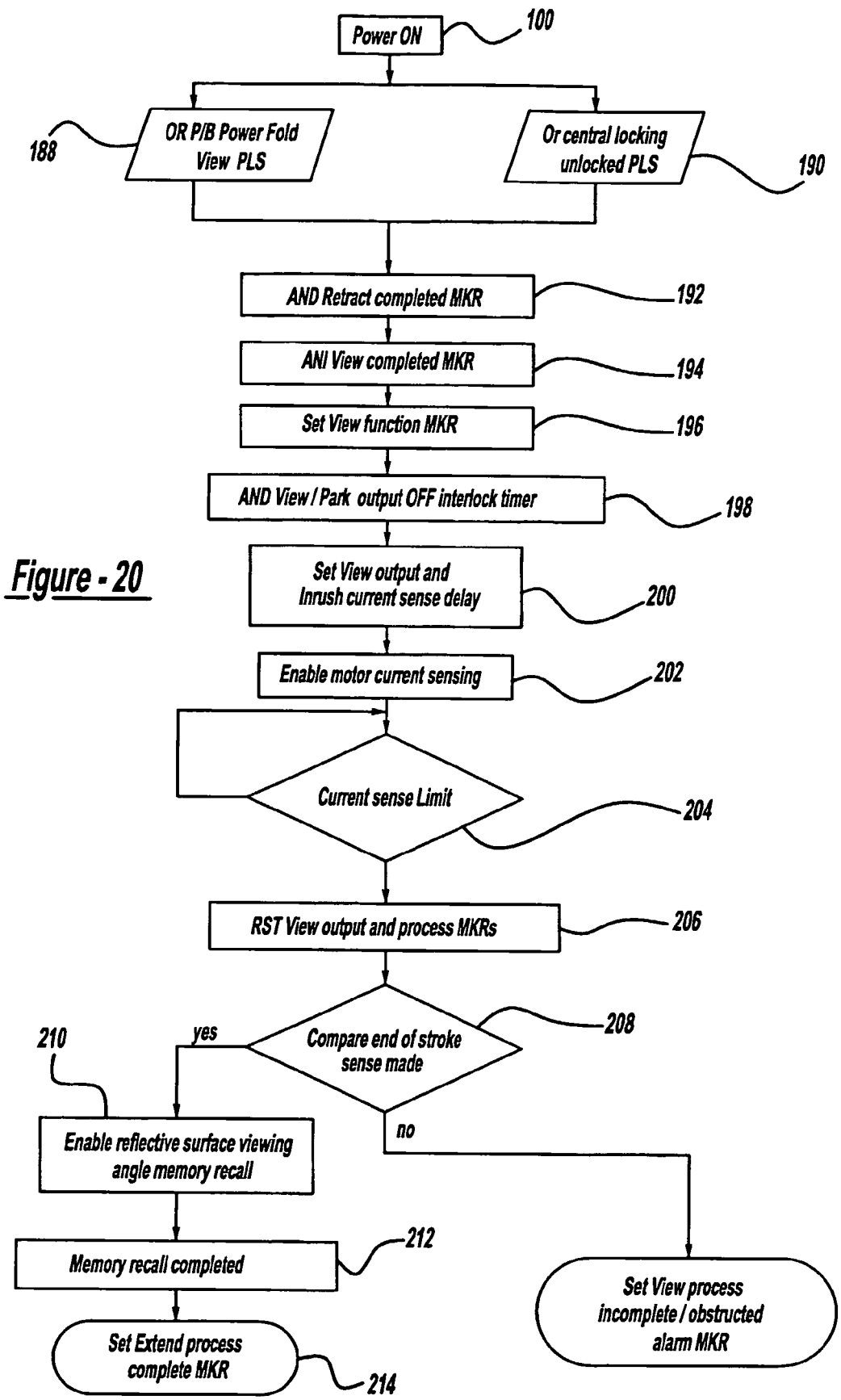
FIG. 20 is a block diagram for the power fold view function of the present invention.

Referring now to FIG. 20, the power fold view function is actuated first by sensing that the power is on, and that either a power fold view pulse is received from the manual switch at 188 or the central locking and unlock pulse is received at 190. If the mirror is sensed to be fully retracted at block 192, the view function is initialized by block 194 and the view function is begun at 196, sensing the park output off interlock 198. Thereafter, the view output pulse is generated at 200 and current motor sensing begins at 202, and continuing to the limit set forth in the loop 204. At the end of the limit, the output and process markers are set at 206 and the stroke is monitored by 208. Thereafter, the reflective viewing angle memory recall block is used to set the mirror for the proper viewing position. After the memory recall is completed at 212, the view process is complete and the CPU reset 214.

Figure 21:
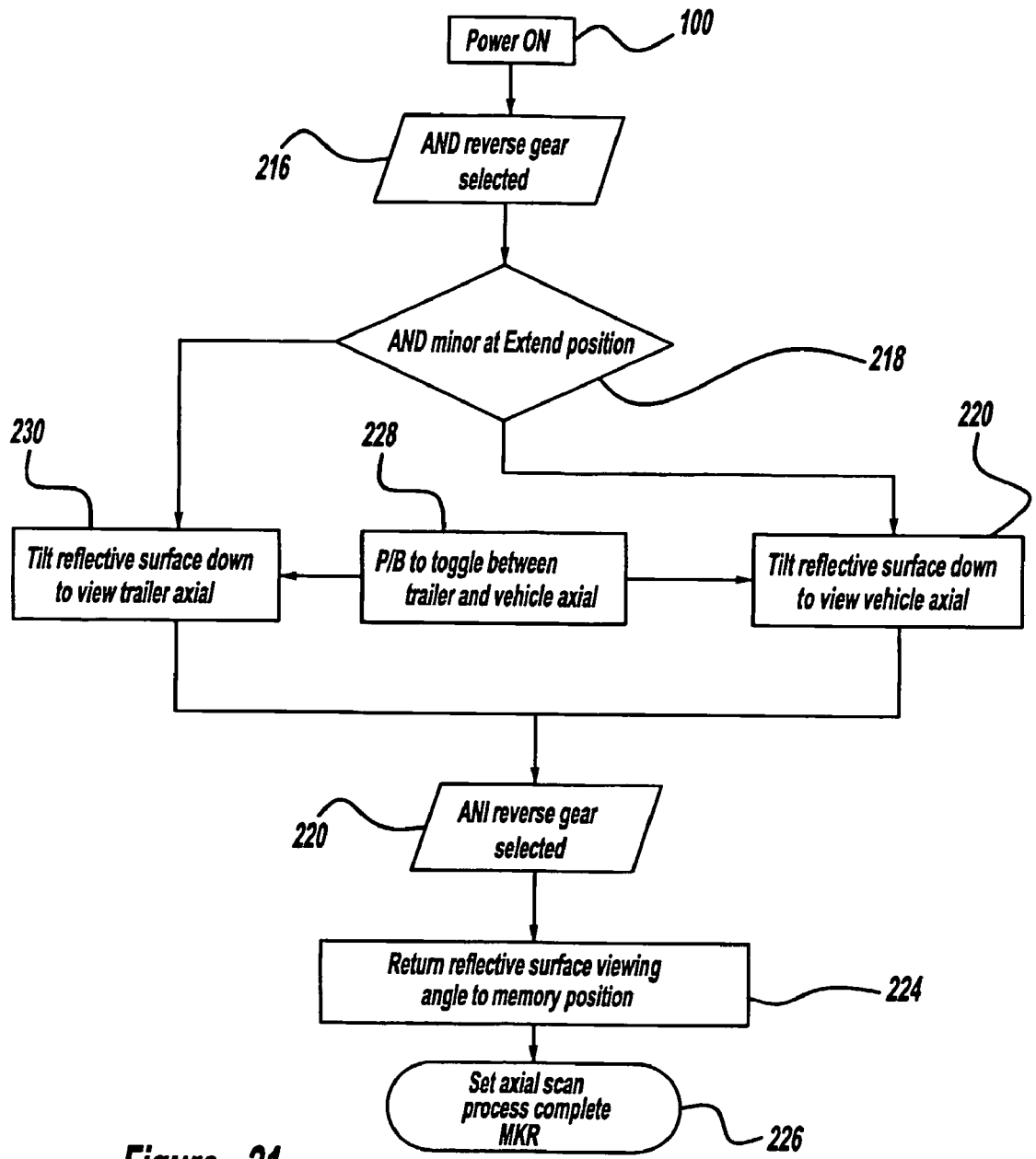
FIG. 21 is a block diagram for an axial scan feature of the present invention.

Referring now to FIG. 21, the actual scan feature of the present invention is shown. Again, the power on condition must be met at block 100. Thereafter, if reverse gear is selected at 216 and the condition senses that the mirror is in the extend position at block 218, two conditions may be applied. If the mirror is not at the extended position, the mirror can be toggled by a manual switch to view the vehicle axle back to the viewing position for the driver at block 220. Thereafter, if reverse gear is deselected at block 222, the mirror surfaces return to the memory position by block 224, and the processor is reset at block 226. If the mirror is in the extended position, the mirror is set to toggle manually by box 228 to view the trailer axle position at 230 or back between the trailer and the vehicle axle.

The foregoing discussion discloses and discusses merely exemplary embodiments of the present invention. One skilled in the art will readily appreciate from the discussion that various changes, modifications and variations can be made in the present invention without departing from the spirit and the scope of the invention as defined in the appended claims.

The invention claimed is:

1. A side view mirror assembly for a vehicle, wherein said side view mirror assembly is longitudinally extendable, said side view mirror assembly, comprising:
   a mechanism operably associated with said side view mirror assembly and selectively operable to extend said side view mirror assembly from a first inboard position to a second extended towing position;
   wherein said mechanism further comprises a mirror casing and a cassette member which are moveable relative to one another for extension and retraction of said side view mirror assembly;
   wherein said mirror casing includes at least one track and said cassette member slideably engages said at least one track for providing movement therebetween;
   wherein said at least one track in said mirror casing includes a stop at an end thereof, said mechanism being selectively operable for driving said mirror casing relative to said cassette member to said stop, and biasing said mechanism toward driving movement beyond said stop for placing structural tension on said side view mirror assembly;
   wherein said at least one track is a slot and said cassette member includes an engagement member for sliding engagement of said slot.

2. The mirror assembly of claim 1, wherein said mechanism further comprises a worm gear drive mechanism for creating relative movement between said mirror casing and said cassette member.

3. The mirror assembly of claim 1, wherein said mirror casing includes a pair of tracks and said cassette member includes a pair of engagement members attached to said cassette member for engaging said pair of tracks.

* * * * *